United States Patent [19]

Meltzer et al.

[11] Patent Number: 5,336,346
[45] Date of Patent: Aug. 9, 1994

[54] METHOD FOR FORMING AN ADHESIVELY BONDED SEAM BETWEEN RESILIENTLY COMPRESSIBLE FABRIC SHEETS

[75] Inventors: Mark J. Meltzer, San Francisco; Tommas J. Tompkins, Berkeley, both of Calif.

[73] Assignee: O'Neill, Inc., Santa Cruz, Calif.

[21] Appl. No.: 2,082

[22] Filed: Jan. 8, 1993

Related U.S. Application Data

[63] Continuation of Ser. No. 557,670, Jul. 24, 1990, abandoned.

[51] Int. Cl.⁵ .............................................. B29C 65/08
[52] U.S. Cl. .................................. 156/73.4; 156/304.1; 156/304.6; 156/304.7; 156/322
[58] Field of Search ............... 156/73.1, 73.4, 157, 156/159, 304.1, 304.3, 304.6, 308.6, 322, 544, 546, 502, 507, 508, 580.1, 580.2, 164, 229, 304.7; 112/262.1, 262.3, 121.26

[56] References Cited

U.S. PATENT DOCUMENTS

| | | | |
|---|---|---|---|
| 2,626,430 | 1/1953 | Dawson | 264/23 |
| 2,941,577 | 6/1960 | Roseman | 156/196 |
| 2,995,181 | 8/1961 | Borys | 156/546 |
| 3,171,415 | 7/1963 | Williamson et al. | 131/66 |
| 3,284,257 | 11/1966 | Soloff et al. | 156/73 |
| 3,294,617 | 12/1966 | Way | 156/304.3 |
| 3,400,030 | 9/1968 | Burger | 156/159 |
| 3,480,492 | 11/1969 | Hauser | 156/73 |
| 3,615,994 | 10/1971 | MacLaine et al. | 156/159 |
| 3,616,123 | 10/1971 | Reynolds | 156/229 |
| 3,652,354 | 3/1972 | Su | 156/580 |
| 3,660,186 | 5/1972 | Sager et al. | 156/305 |
| 3,904,457 | 9/1975 | Laughlin | 156/73.4 |
| 3,909,341 | 9/1975 | Moscovita | 156/304.6 |
| 4,173,509 | 11/1979 | Raabe et al. | 156/304 |
| 4,231,836 | 11/1980 | Ljungqvist et al. | 156/157 |
| 4,416,027 | 11/1988 | Perla | 156/159 |
| 4,675,016 | 6/1987 | Meuli et al. | 156/164 |
| 4,747,894 | 5/1988 | Johnston et al. | 156/580.2 |
| 4,867,823 | 9/1989 | Pizzorno | 156/157 |

FOREIGN PATENT DOCUMENTS

| | | | |
|---|---|---|---|
| 0078645 | 12/1970 | Fed. Rep. of Germany | 156/157 |
| 11220 | 2/1981 | Japan | 156/304.6 |
| 53040 | 5/1981 | Japan | 156/308.8 |

OTHER PUBLICATIONS

Adhesives Handbook, CRC Press, 1970, pp. 258-260.
The Vanderbilt Rubber Handbook, 1958, p. 200.

*Primary Examiner*—Michael W. Ball
*Assistant Examiner*—Steven D. Maki
*Attorney, Agent, or Firm*—Felhr, Hohbach, Test, Albritton & Herbert

[57] ABSTRACT

An apparatus for forming a butt seam between opposed edges of resiliently compressible fabric sheets, such as foamed neoprene for wet suits and dry suits. The apparatus includes fabric manipulating assembly which continuously compresses the sheets proximate and inwardly of the edges, preferably by a roller assembly, to form opposed shoulders or areas that will permit the application of a lateral force to firmly press the opposed edges of the flexible and compressible sheets tightly together during movement and bonding along the seam. The apparatus preferably includes adhesive activation means in the form of an ultrasonic transducer which contacts the neoprene pieces in advance of compression rollers to activate a dry neoprene cement carried on the edges of the fabric pieces. A method for forming the butt seam is described, as are alternatively adhesive activating assemblies and a seamed neoprene fabric sheet.

4 Claims, 9 Drawing Sheets

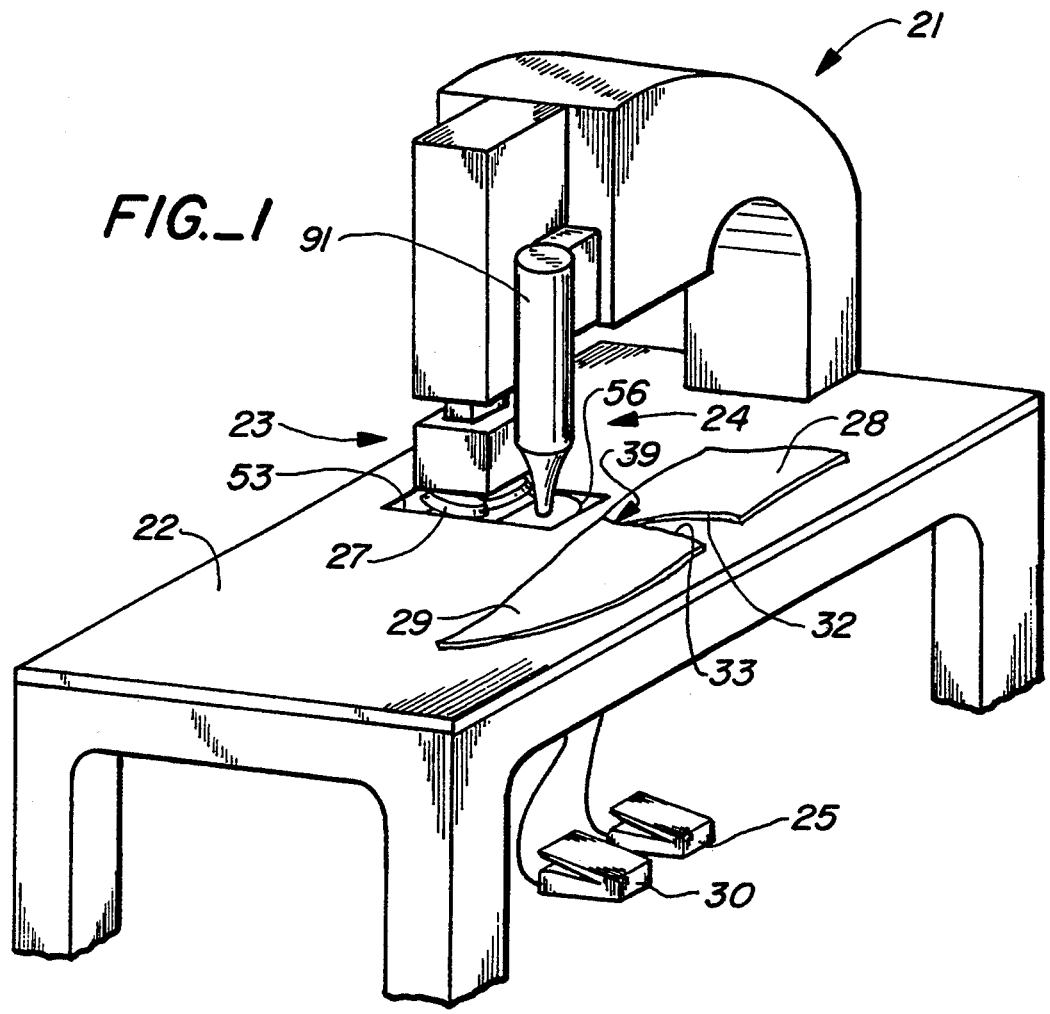
FIG._1
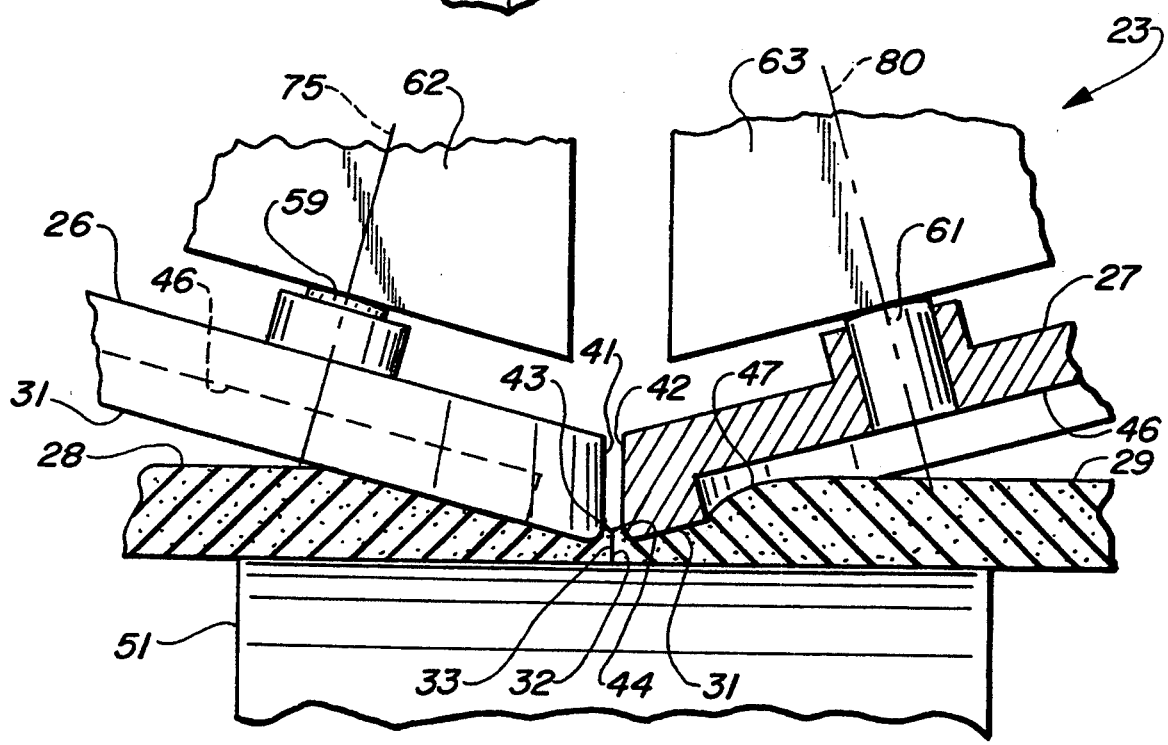
FIG._4

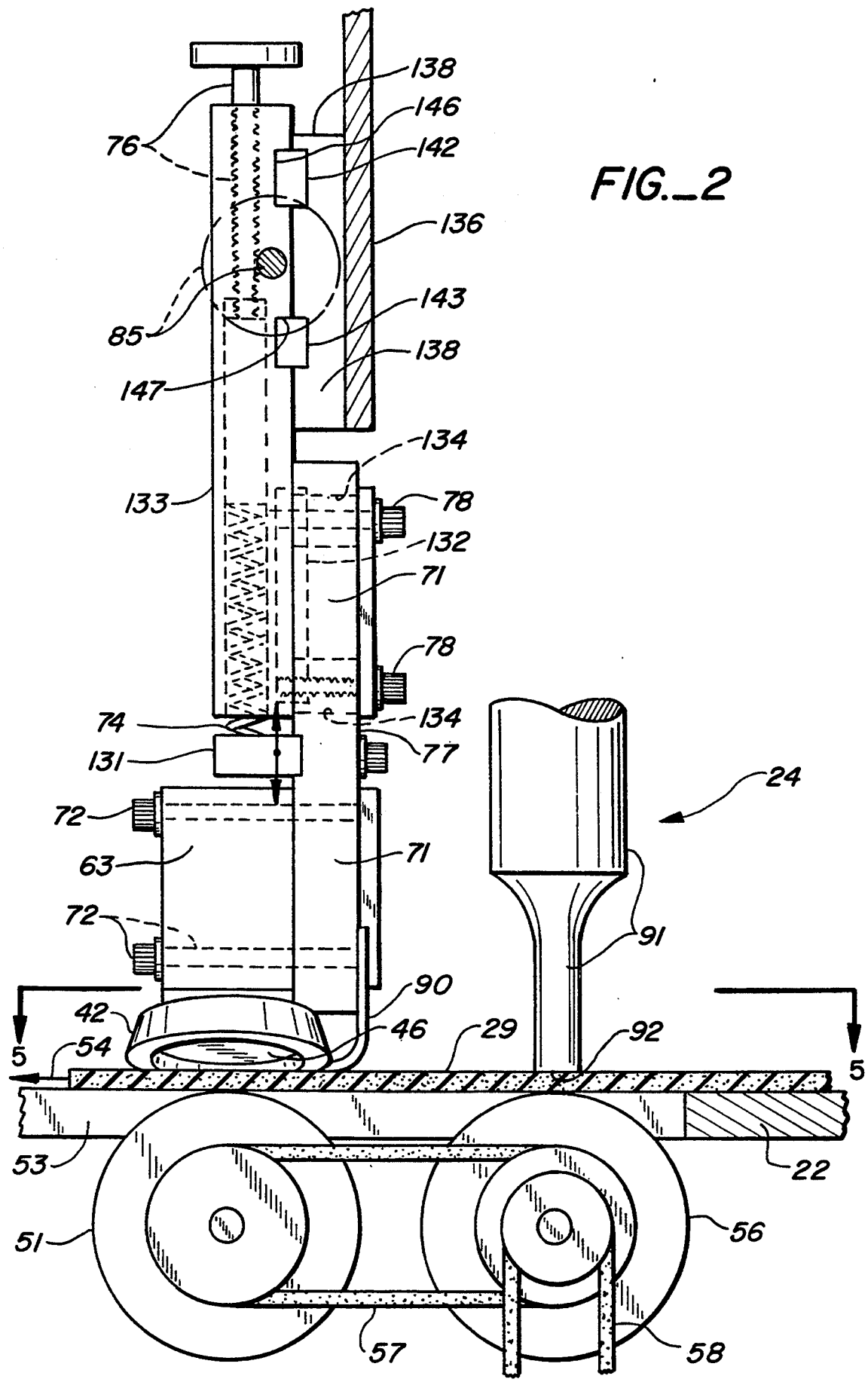

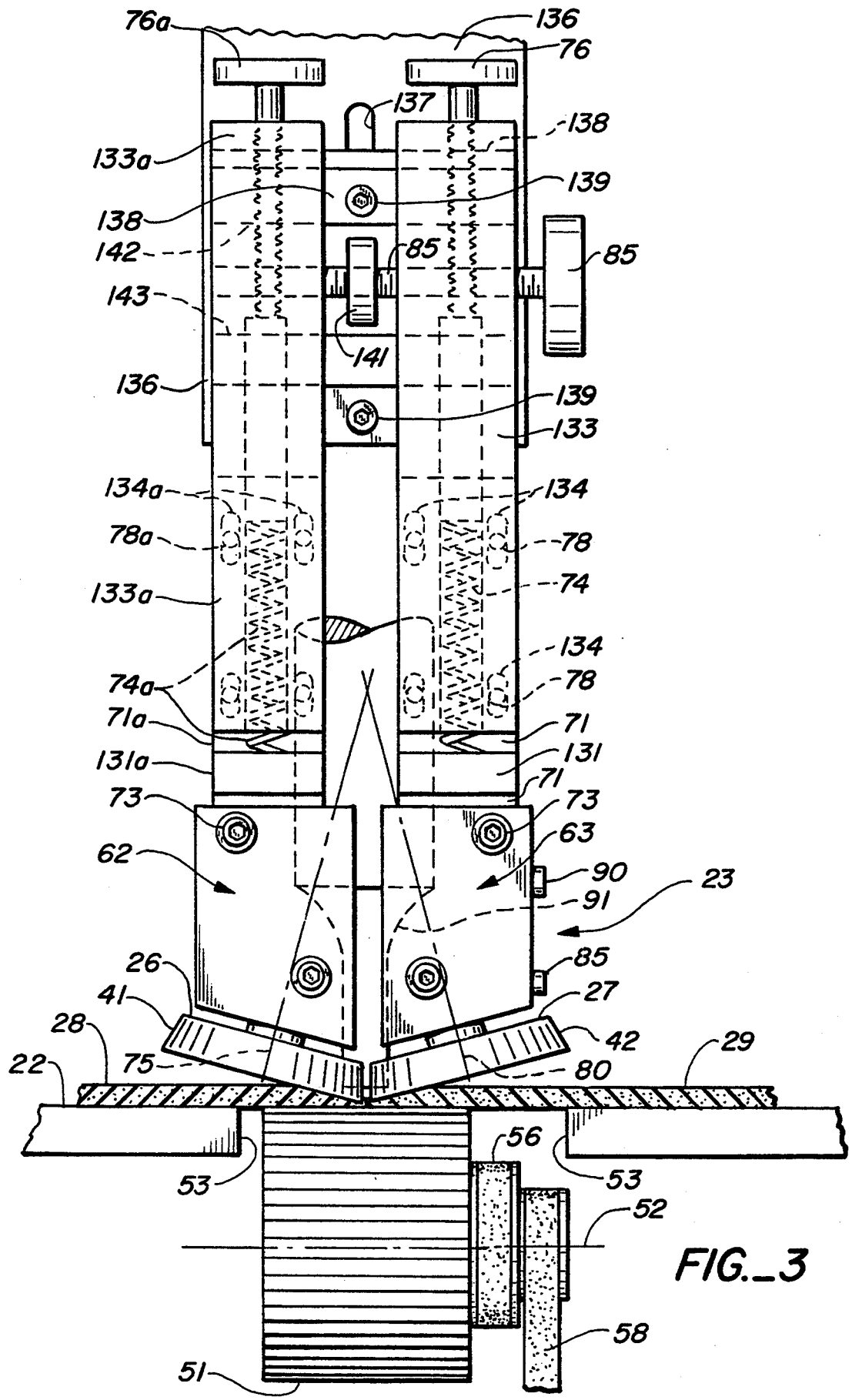
FIG._3

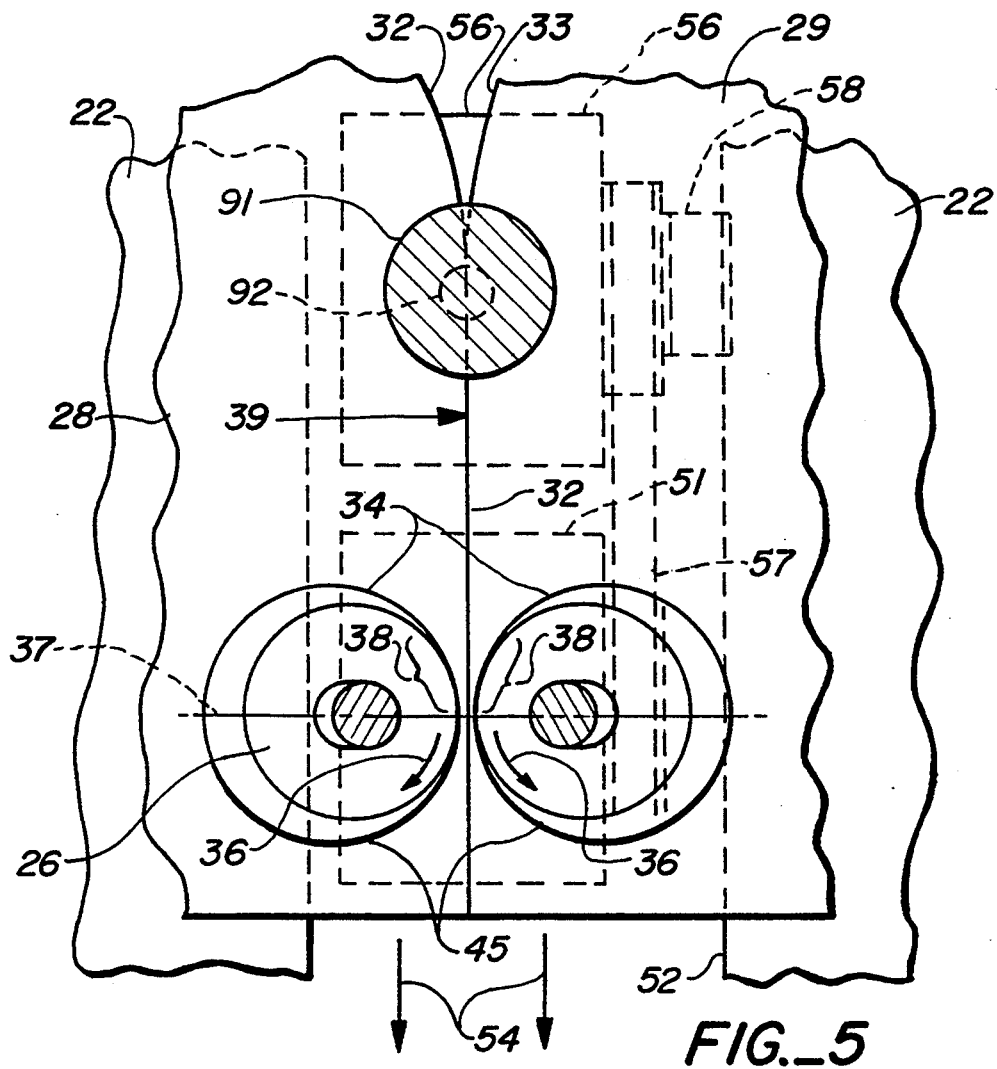
FIG._5
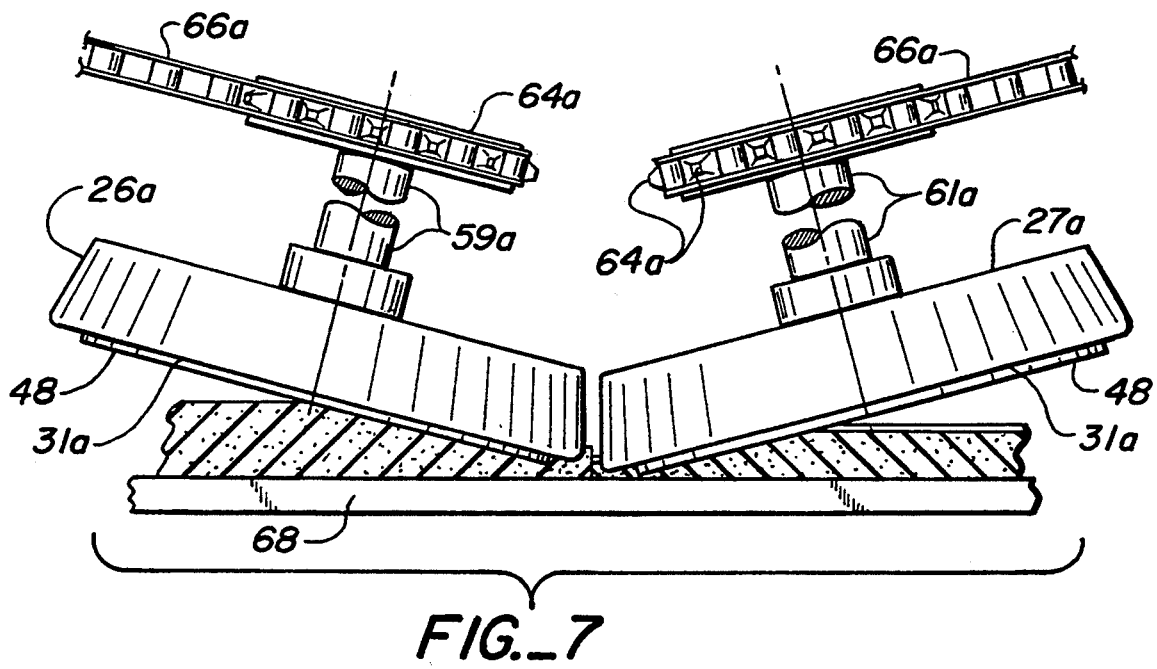
FIG._7

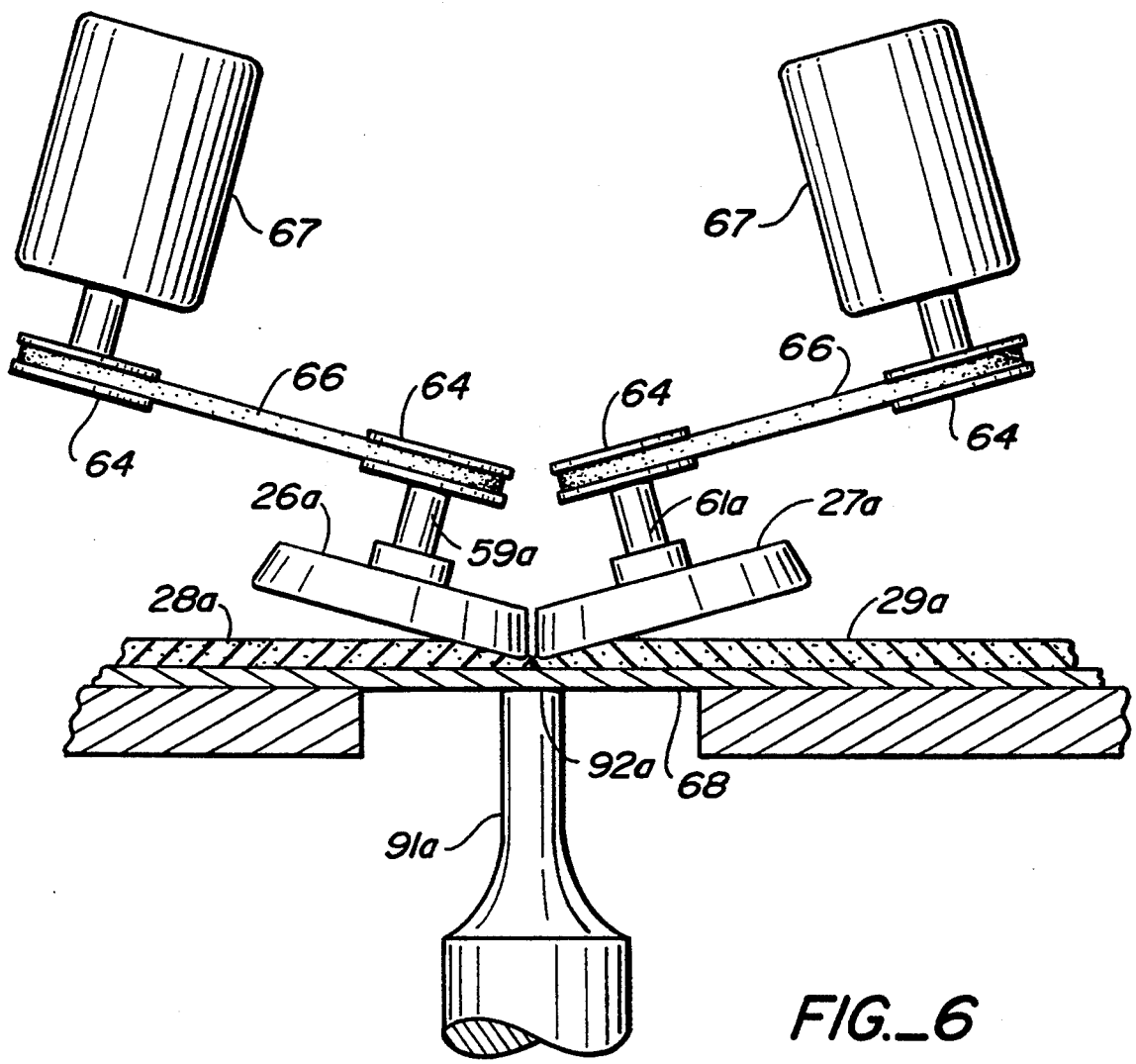
FIG._6
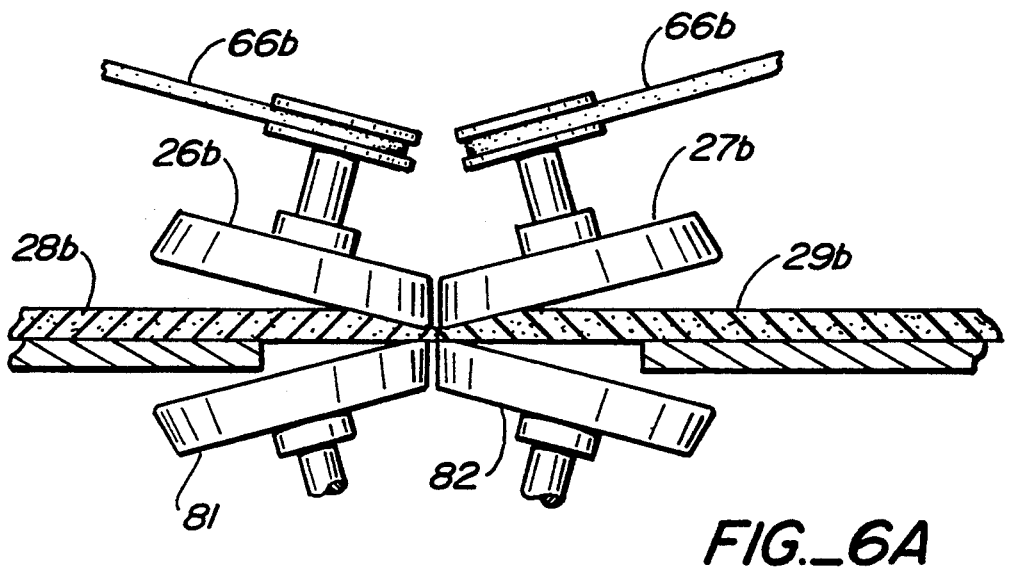
FIG._6A

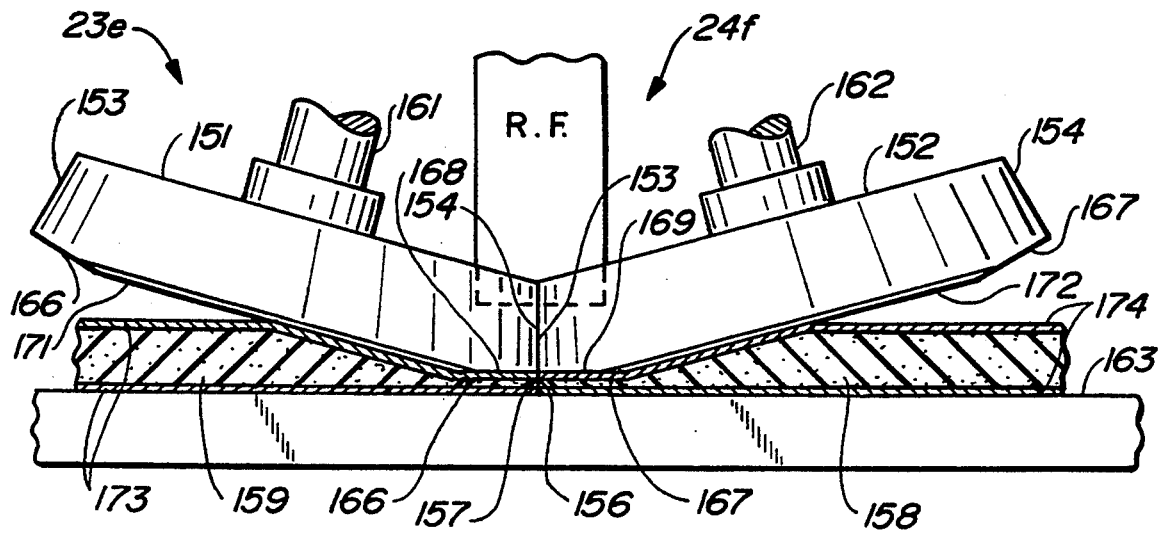
FIG._7A
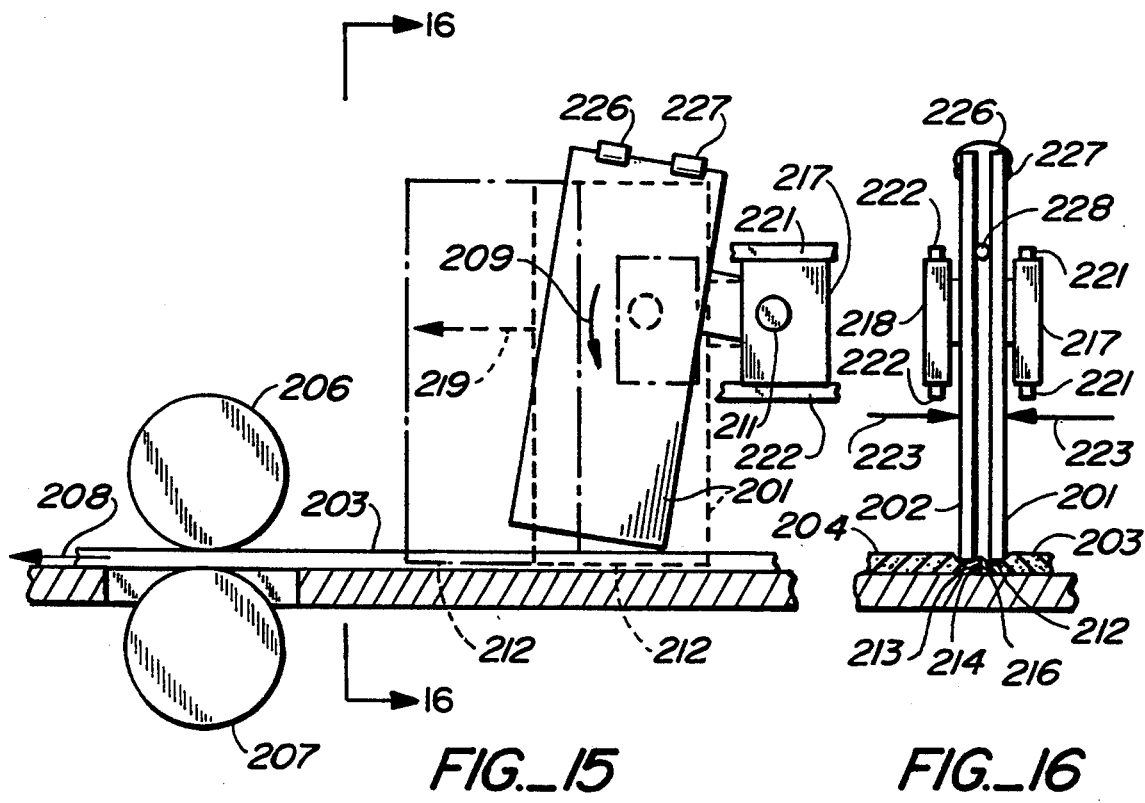
FIG._15  FIG._16

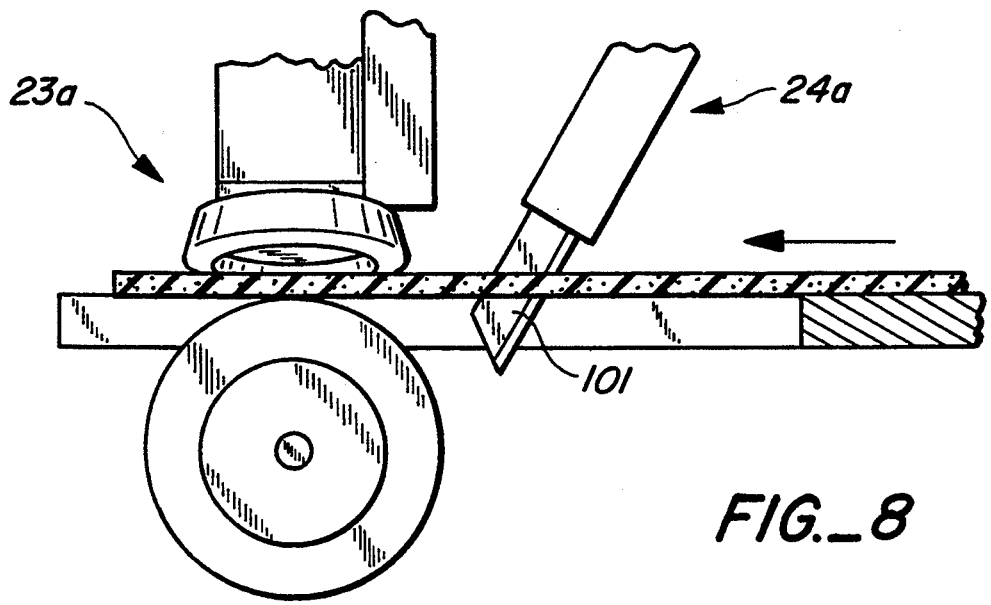
FIG._8
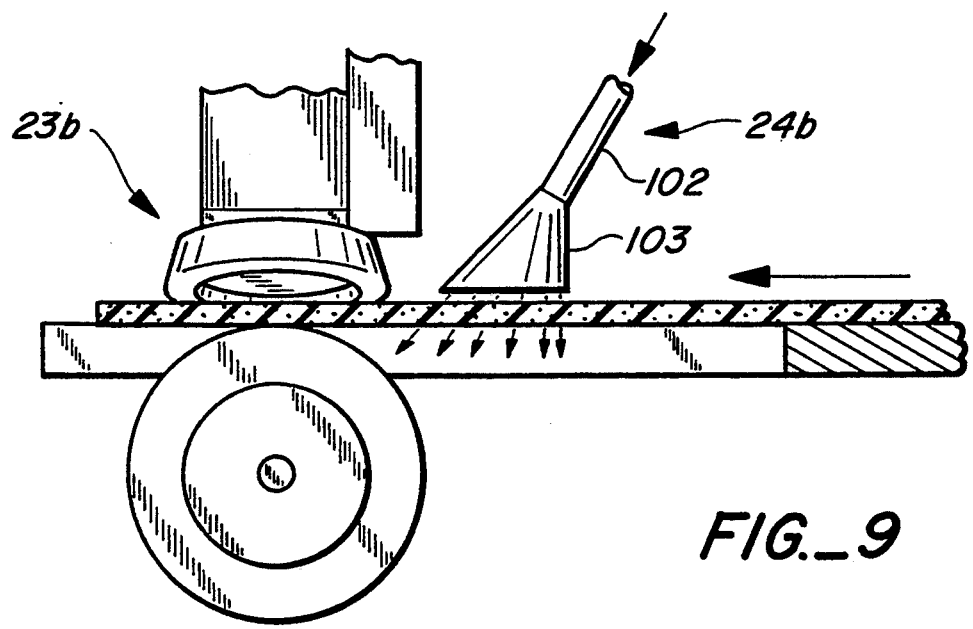
FIG._9
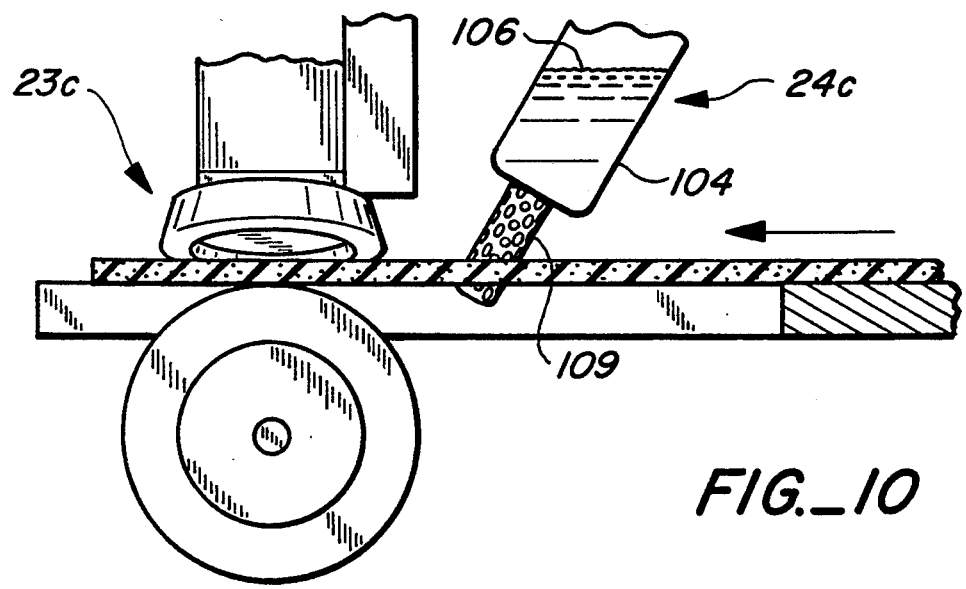
FIG._10

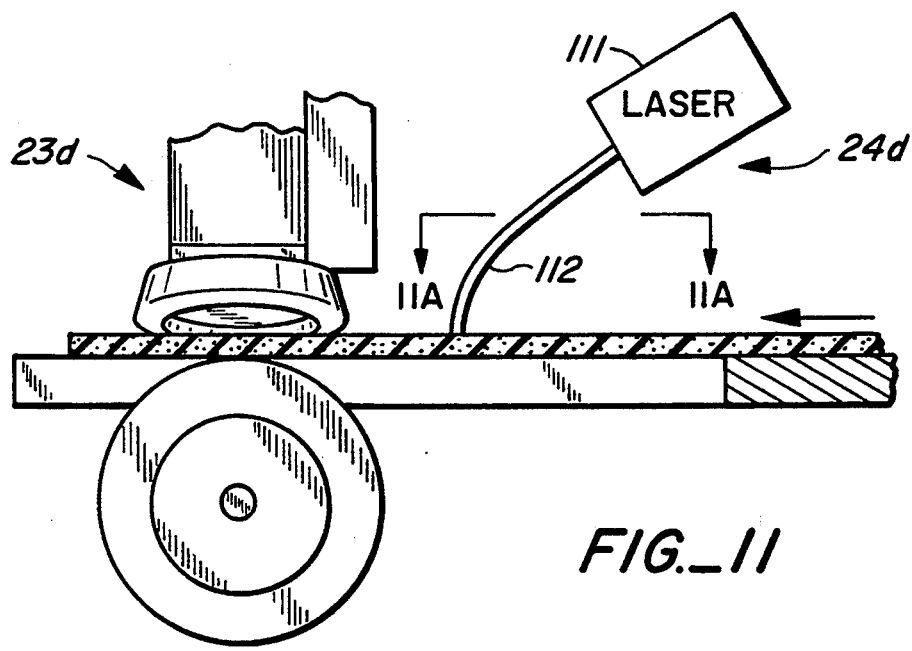
FIG._11
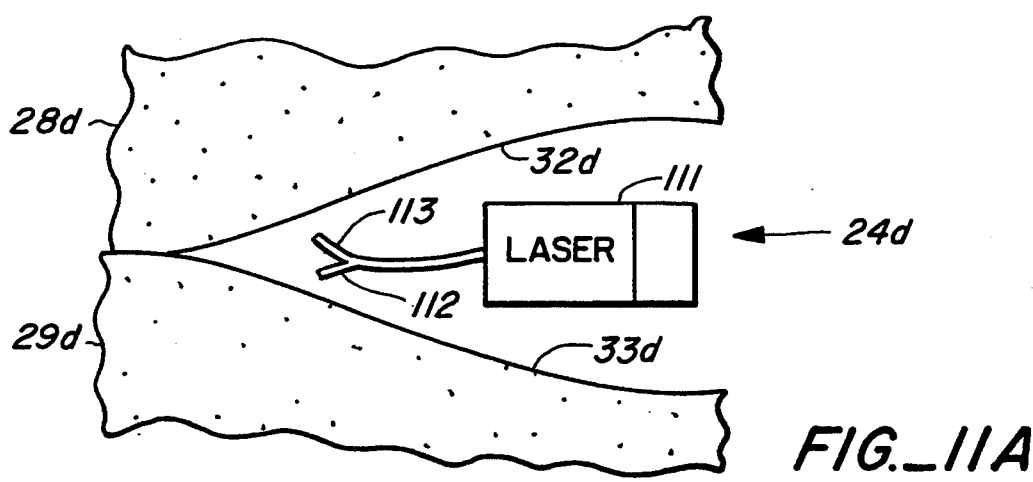
FIG._11A
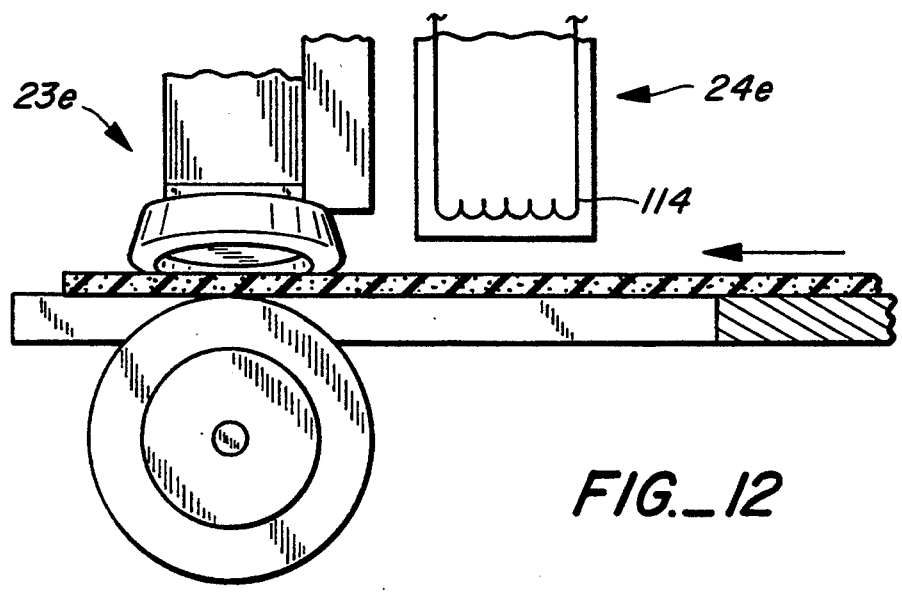
FIG._12

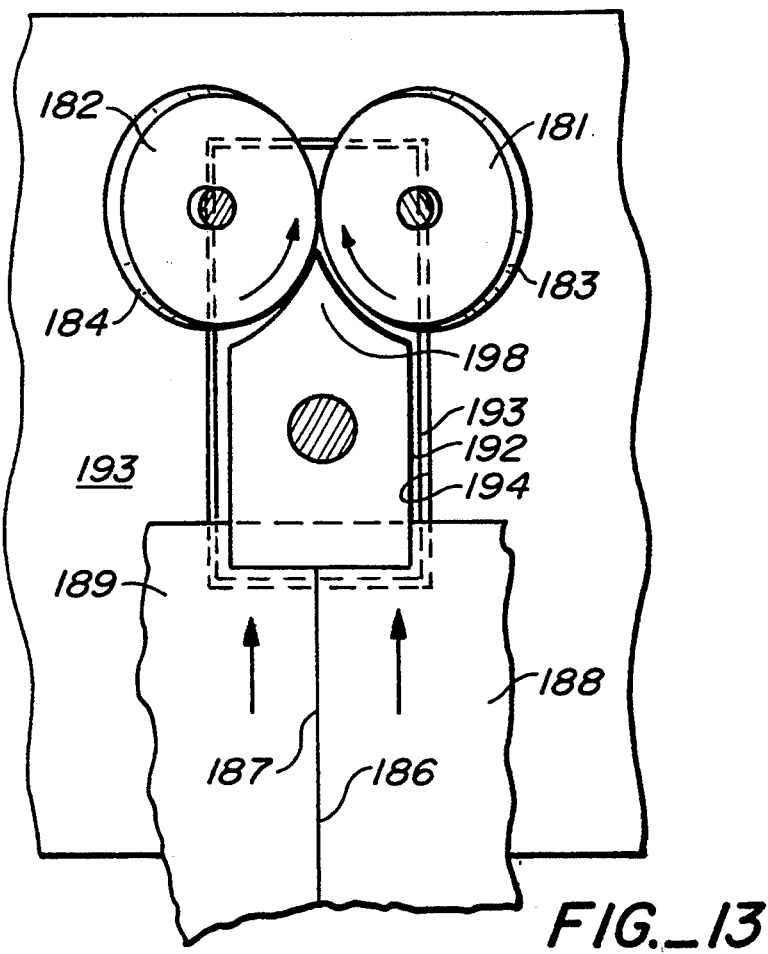
FIG._13
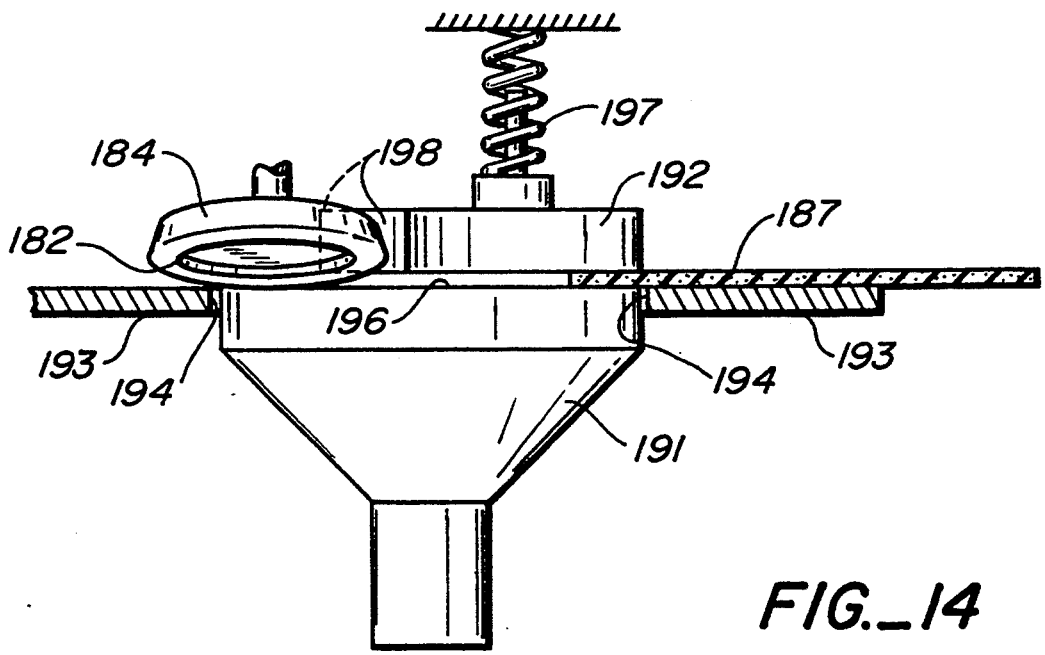
FIG._14

METHOD FOR FORMING AN ADHESIVELY BONDED SEAM BETWEEN RESILIENTLY COMPRESSIBLE FABRIC SHEETS

This is a continuation of application Ser. No. 07/557,670 filed Jul. 24, 1990, now abandoned.

TECHNICAL FIELD

The present invention relates, in general, to the formation of seams between two opposed edges of fabric sheets, and more particularly, relates to apparatus and methods for the formation of adhesively bonded seams between resiliently compressible and flexible sheets of material of the type used in wet suits, dry suits and the like.

BACKGROUND OF THE INVENTION

Wet suits and dry suits of the type used in aquatic sports, such as wind surfing, board surfing, water skiing and scuba diving typically are fabricated from pieces of foamed neoprene rubber. The suits are comprised of various fabric pieces which are cut into shapes that accommodate the user's anatomy, provide desired elongation, and provide a variety of aesthetic effects. The wet suit pieces are joined together in seams which are either stitched or adhesively bonded, or a combination of both.

When a wet suit is fabricated using a seam stitching technique, the cost of manufacturing the wet suit is reasonable since conventional fabric seaming equipment, such as overlock sewing machines, can be employed. Thus, wet suits having stitched seams are well suited to production sewing and semi-automated fabrication.

Unfortunately, wet suits having overlock-type stitched seams inherently leak water at the seams, which is tolerable for a wet suit, in that it is contemplated that water will enter the wet suit, but is unacceptable for dry suits and for wet suits which are intended for use in cool or cold water locations.

Accordingly, dry suits and wet suits which are designed for use in cold water are formed from pieces of neoprene material which are adhesively bonded together in butt seams so as not to leak water at the seams. Sometimes these suits are also blind stitched to reinforce the seam, but using current adhesive bonding techniques, the glued seams typically have a strength which is at least as great as the foamed neoprene rubber itself.

Adhesively bonding or gluing together two foamed neoprene sheets, however, is a very labor intensive process. Conventional garment-industry fabrication techniques cannot be used because the resiliently compressible neoprene pieces are very difficult to manipulate, and the neoprene requires the application and/or activation of an adhesive bonding material on the edges of the pieces to be joined together.

Wet suits and dry suits are formed from neoprene sheets which have a thickness in the range of about 1 to about 6 millimeters, and the foamed neoprene fabric is both resiliently stretchy and flexible. In some instances, pieces of different thicknesses are bonded together, and often the neoprene will have a nylon fabric facing bonded to one or both sides of the sheet.

Currently, neoprene adhesive bonding is accomplished by applying a neoprene adhesive to the edges of the sheets to be bonded together. Usually the adhesive is applied to a plurality of similarly shaped pieces that are stacked with their edges exposed so that the adhesive can be applied to the edges only. The adhesive is then allowed to dry. A solvent is used to reactivate the adhesive when two pieces are to be seamed together. The pieces to be joined have their edges painted with solvent and then are pressed together by hand. Finally, a pair of pneumatic pliers must be used to positively press or squeeze the edges of the pieces together to insure uniform bonding. The pliers are pushed down into the neoprene foam and the jaws are closed to press the abutting edges of adjacent pieces together. This is repeated along the length of the seam by using a series of longitudinally adjacent pinching and moving steps.

While this technique produces a strong seam, the application of solvent, pressing together of the fabric pieces by hand and pneumatic squeezing of the pieces to ensure bonding all is labor intensive and undesirably costly. Moreover, the pneumatic pliers clamp the pieces together in a manner which appears to result in residual stresses in the seam. Additionally, there are significant health and safety hazards to the wet suit fabricator in connection with the application of solvent and the use of pneumatic pliers.

An example of a stitched and bonded seam construction suitable for use in wet suits or the like is shown in U.S. Pat. No. 4,416,027 to Perla. This seam also includes a reinforcing insert, but as will be apparent, the hand labor required to create such a seam, and therefore the cost of forming the same, is substantial.

Adhesively bonded butt seams have been formed between sheets of plastic and rubber for various other applications. In U.S. Pat. No. 3,615,994 to MacLaine, laminated vinyl-foam resin impregnated sheets, which include a middle foamed layer, are joined together in a butt seam. In the process and apparatus of the MacLaine patent, however, the two edges which are joined at the seam are not compressed proximate the seam by an amount stabilizing the foam, nor are the edges firmly pressed against each other. Instead the sheets are merely held in registration or crowded together by crowding conveyors.

In U.S. Pat. No. 4,231,836 to Ljungqvist, et al. and U.S. Pat. No. 4,867,823 to Pizzorno apparatus and processes for joining together unvulcanized rubber fabric of the type used in automobile tires are disclosed. In both patents, cord strips, which are comprised of fiber or metallic cords that are oriented in a predetermined direction and surrounded by unvulcanized rubber, are joined in edge-to-edge abutting relationship. The apparatus in both patents includes bevelled wheel or roller assemblies which progressively urge the two opposed cord strip pieces toward each other during formation of the seam. The cord strips are held together initially by reason of the inherent stickiness of the unvulcanized rubber, and a separate vulcanization process is required to permanently bond the sheets together.

In both Ljungqvist, et al. and Pizzorno, the sheets being joined are not resilient, but instead are deformable or plastic, unvulcanized rubber sheets (with reinforcing cords or fibers). Since the unvulcanized rubber cord strips are plastic, application of substantial pressure to the cord strips during the joining process will permanently deform the strips. Thus, in Ljungqvist, et al. grooved wheels engage the cords to urge the strips together with minimal rubber deformation. In Pizzorno the rubber sheets are urged together by wide bevelled roller elements which are skewed and have peripheral surfaces oriented parallel to the sticky top and bottom rubber sheet surfaces. Additionally, in Pizzorno a guide wing structure is provided to direct the sheets toward each other. Thus, the wide rollers engage the top, and preferably the bottom, sticky surfaces of the sheets, and urge the sheets together.

While the Ljungqvist, et al. and Pizzorno patents disclose seam forming apparatus which is suitable for moving plastic, sticky, unvulcanized, reinforced rubber cord strips together to form a butt joint, which is subsequently bonded in a separate operation by vulcanization, they do not suggest or attempt to solve the problem of forming a butt seam between resilient, compressible, flexible foamed fabric sheets to which adhesive must be added. The flexible and compressible nature of foamed neoprene rubber, plus the inherent need to employ an adhesive agent, makes the formation of adhesively bonded butt seams very difficult. The neoprene material must be compressed positively together proximate the edges to insure uniform adhesive bonding, and the entire process must be capable of semi-automation so as to be economically comparable to sewn seams such as those made by overlock-type sewing machines. In the Ljungqvist, et al. and Pizzorno patents, for example, the vulcanizing step, which is necessary for a permanent bonded seam, is not integrated with the process of moving the sheets together to form a seam.

Other adhesive activation systems are known in the prior art, but they have largely been applied in lap seams with sheet stock that is not compressible. In U.S. Pat. No. 3,171,415 to Williamson, et al., for example, ultrasonic welding is used to join together the edges of cigarette paper in a lap seam. In U.S. Pat. No. 3,284,257 to Soloff, et al., ultrasonic melting of thermoplastic and thermosetting materials to form a fusion joint is disclosed, and thermally activatable rubber-based adhesives are ultrasonically activated to effect bonding of nylon parts. The patent to Soloff, et al. also discloses bonding together fabrics or textiles in a lapped or accordion arrangement. In U.S. Pat. No. 3,480,492 to Hauser, nylon parts are lapped and bonded together by ultrasonic energy using a nitrocellulose adhesive or epoxy with an exothermic additive. Similarly, in U.S. Pat. No. 3,652,354 to Su, a lap seam is formed between paper sheets soaked with a metal salt complex by using ultrasonic activation, while in U.S. Pat. No. 4,747,894 to Johnston, et al., ultrasonic activation of a starch-based adhesive to form lap seams for corrugated paper board is disclosed.

The suitability of ultrasonic adhesive activation for use in bonding foamed neoprene fabric, however, has not been pursued before, perhaps because of the observed thermal sensitivity of glued neoprene. One commonly encountered problem in connection with adhesively bonded wet suits, for example, is that the bonded seams can fail when exposed to high temperatures. Surfers standing in their wet suits in front of a bonfire on a beach, for example, have reported bonded seam failures. Previous attempts to heat-weld foamed neoprene fabric sheets together have been unsuccessful since the vulcanized neoprene does not have true thermoplastic characteristics. Intense heating merely produces burning and carbonizing of the neoprene material rather than the melting associated with vinyl and other thermoplastics which are directly heat weldable.

While foamed neoprene remains as the predominant material in wet suit and dry suit construction, other materials such as HYPALON (Dupont), KRATON (Shell) and various types of foamed plastics, such as urethane, can be used. For the purpose of brevity, this application primarily will mention neoprene rather than engaging in repeated recitations of alternative materials. The invention disclosed, however, is useful in connection with these alternative materials and in certain cases, such as in the use of HYPALON, the apparatus and process of the present invention can bond either neoprene or HYPALON without modifying the apparatus which is set up for neoprene.

Joining together pieces of neoprene foam in an adhesive butt seam by a continuous semi-automated process, therefore, has presented a substantial challenge. The flexibility and resiliency of the foam makes it difficult to manipulate. The need to use adhesives poses additional manipulation and activation problems and makes automation, with attendant cost reduction, harder to achieve.

Accordingly, it is an object of the present invention to provide an apparatus and method for forming adhesively bonded butt seams between resiliently compressible neoprene sheets which can be adapted to more conventional garment forming techniques with substantial attendant cost savings.

It is another object of the present invention to provide an apparatus and method for forming adhesively bonded seams between neoprene foam sheets which is capable of producing a seam which is very uniform and free of residual stress so as to be at least as strong as the material itself.

Another object of the present invention is to provide a method for forming an adhesively bonded butt seam between resiliently compressible, flexible fabric sheets which can be accomplished in a continuous semi-automated operation.

It is a further object of the present invention to provide an apparatus and method for forming an adhesively bonded, butt seam between resiliently compressible, flexible, fabric pieces in which the manipulation of the pieces and their bonding together is integrated into a single continuous process.

Another object of the present invention is to provide a butt seam formation process suitable for joining neoprene foam pieces together in which seam bonding is achieved by an automated seam clamping process.

Still a further object of the present invention is to provide a butt seam forming apparatus and method in which resiliently compressible fabric sheets can be bonded adhesively together by a manipulating assembly which requires minimal skill to supervise and operate.

Still a further object of the present invention is to provide an apparatus and method for forming adhesively bonded seams between neoprene sheets in which health hazards are reduced and safety is increased.

Another object of the present invention is to provide a method and apparatus which is suitable for adhesively bonded together neoprene sheets of different thicknesses in a butt seam.

Still another object is to provide an adhesively seamed fabric member in which the seam is substantially free of residual stress and bonding is more uniform along the seam.

Still another object of the present invention is to provide an apparatus and method for forming adhesively bonded butt seams between resiliently compressible fabric sheets which produces a durable, high-strength seam, can be accomplished with relatively inexpensive equipment, requiring minimal training and maintenance, and which enables integration of a variety of adhesive activation systems with the material handling equipment.

The apparatus and process of the present invention have other objects and features of advantages which will become apparent from and/or will be set out in more detail in the accompanying drawing and following description of the Best Mode Of Carrying Out The Invention.

DISCLOSURE OF INVENTION

In one aspect of the present invention, an apparatus for forming a butt seam between opposed edges of two resiliently compressible, flexible fabric pieces is provided which includes a fabric urging assembly and transport means producing relative motion between the pieces to progressively urge the edges together into abutting contact along the seam. The improvement in the apparatus of the present invention is comprised, briefly, of the urging assembly, during motion of the pieces or urging assembly or both, compressing a portion of the pieces proximate and inwardly of the edges, and the urging assembly applying a lateral force in a direction toward the edges through the adjacent compressed portion of the piece to positively press the edges together while the pieces are in abutting contact.

In another aspect of the present invention, the apparatus further includes an ensonification assembly mounted proximate the fabric manipulating assembly for transmission of sufficient sonic energy to the pieces, to cause an adhesive material carried by at least one of the edges to become suitable for adhesive bonding when the edges are pressed together by the fabric manipulating assembly.

The method of forming a butt seam between opposing edges of two resiliently compressible fabric pieces of the present invention is comprised, briefly, of the steps of compressing the thickness dimension of at least one of the pieces proximate an edge thereof, and applying a lateral force to the pieces to positively press the edges into abutting contact. The present method also preferably includes the step of activating an adhesive material carried by at least one of the edges, most preferably by ensonification, to produce adhesive bonding between the edges when they are pressed together.

In a final aspect of the invention, a seamed fabric sheet is provided which includes two resiliently compressible fabric pieces joined together by an adhesively bonded seam in which opposed edge portions are bonded together substantially without residual stress in the seam, which residual stress results from non-uniform or discontinuous bonding together of shifted or laterally displaced opposed edge portions.

BRIEF DESCRIPTION OF THE DRAWING

FIG. 1 is a top perspective view of an apparatus constructed in accordance with the present invention for joining the edges of two resiliently compressible, flexible fabric pieces in an adhesively bonded butt seam.

FIG. 2 is an enlarged, side elevation view, partially in cross section, of the apparatus of FIG. 1.

FIG. 3 is a rear elevation view corresponding to FIG. 2.

FIG. 4 is an enlarged, fragmentary, rear elevation view, partially in cross section, of the roller assembly of the apparatus of FIG. 1.

FIG. 5 is a fragmentary, top plan view, in cross section taken substantially along the plane of line 5—5 in FIG. 2.

FIG. 6 is a fragmentary, rear elevation view, corresponding to FIG. 3, of an alternative embodiment of the fabric manipulating roller assembly of the apparatus of the present invention.

FIG. 6A is a rear elevation view corresponding to FIG. 6 of another alternative embodiment of the fabric manipulating roller assembly.

FIG. 7 is an enlarged, fragmentary, rear elevation view, corresponding to FIG. 4 of the fabric manipulating roller assembly of FIG. 6.

FIG. 7A is a fragmentary, rear elevation view corresponding to FIG. 7 of an alternative embodiment of the fabric manipulating roller assembly and adhesive activation assembly.

FIG. 8 is a schematic, fragmentary, side elevation view, corresponding to FIG. 2, and showing adhesive activation by a hot knife.

FIG. 9 is a schematic, fragmentary, side elevation view, corresponding to FIG. 2, and showing adhesive activation by a stream of hot gases.

FIG. 10 is a schematic, fragmentary, side elevation view, corresponding to FIG. 2, and showing adhesive application and/or activation by means of the application of a solvent.

FIG. 11 is a schematic, fragmentary, side elevation view, corresponding to FIG. 2, and showing adhesive activation by means of a laser.

FIG. 11A is a fragmentary, top plan view of the assembly of FIG. 11.

FIG. 12 is a schematic, fragmentary, side elevation view, corresponding to FIG. 2, and showing adhesive activation by inductive heating.

FIG. 13 is a fragmentary, schematic top plan view corresponding to FIG. 5 of an alternative embodiment of seam forming apparatus of the present invention.

FIG. 14 is a side elevation view, in cross section of the apparatus of FIG. 13.

FIG. 15 is a reduced scale, schematic, side elevation view of a clamping assembly suitable for use in the present invention.

FIG. 16 is an end elevation view taken substantially along the plane of line 16—16 in FIG. 15.

BEST MODE OF CARRYING OUT INVENTION

The apparatus and method of the present invention employ a fabric manipulating assembly which is capable of, not only urging resilient, compressible, flexible fabric sheets or pieces of material together, but also is capable of firmly pressing the edges of the pieces toward each other with sufficient force to enable reliable and uniform stress-free adhesive bonding of the pieces together along a butt seam. Moreover, the fabric manipulating apparatus and method can be used with various kinds of adhesive activation assemblies to produce a continuous seam forming apparatus and method capable of forming adhesively bonded butt seams in fabrics such as foamed neoprene at a cost which is comparable to sewn seams.

Wet suits and dry suits are conventionally formed from foamed neoprene fabric pieces or sheets that are joined together along adhesively bonded butt seams. Lap seams would be easier to form, but they lack the comfort, aesthetics and function (stretchability) of butt seams. Moreover, formation of a butt seam between neoprene fabric sheets requires that an adhesive be applied to the edges of the neoprene pieces and that the edges be firmly and positively pressed together to insure uniform, reliable bonding along the seam.

Merely manipulating neoprene fabric pieces into abutting contact along opposed edges of the pieces does not pose a difficult problem. The difficulty arises in connection with attempting to firmly press the edges together to produce uniform, residual stress-free, reliable bonding. The neoprene is highly flexible; it also is resiliently compressible and even stretchable. Additionally, wet suit and dry suit manufacture often requires the joining together of fabric pieces which are of differing thicknesses and which may or may not have a nylon facing sheet bonded to one or both sides of the pieces.

Accordingly, the problems associated with devising a process and apparatus for continuously pressing together edges of flexible, resiliently compressible, thin, foamed neoprene sheets to achieve reliable, stress-free, adhesively bonded, butt seams, which are necessary for dry suits and cold-water wet suits, are substantial.

FIGS. 1 through 5 illustrate a seam forming apparatus constructed in accordance with the present invention and generally designated 21. Mounted above a support table 22 are a fabric manipulating assembly, generally designated 23, and an adhesive applying/activating assembly, generally designated 24. Manipulating assembly 23 is particularly well suited for joining together pieces of neoprene foamed fabric of the type conventionally in wet suits and dry suits in an improved, uniform, high-strength seam.

In seam forming apparatus 21, fabric manipulating assembly 23 is formed in a manner which is capable of not only bringing resiliently compressible neoprene pieces together along a seam line, but further can firmly press the neoprene edges against each other in a continuous process to insure reliable adhesive bonding. In FIGS. 3 and 4, the details of construction of fabric manipulating assembly 23 can be seen. Manipulating assembly 23 includes a pair of side-by-side, spaced apart, counter-rotating roller means 26 and 27, which are in rolling engagement with resiliently compressible, flexible, fabric pieces 28 and 29. Roller means 26 and 27 preferably take the form of frusto-conical rollers having bases 31, facing and in rolling engagement with pieces 28 and 29, and peripheral frusto-conical surfaces 41 and 42 facing each other.

In order to insure that the resiliently compressible neoprene pieces are not only brought together, but have their edges 32 and 33 reliably adhesively bonded together, a technique must be employed which will enable edges 32 and 33 to be pressed firmly and positively towards each other. Fabric manipulating rollers 26 and 7 are mounted to compress at least one, and preferably both, of the pieces of fabric at a position or portion thereof proximate and inward of edges 32 and 33. This may be best seen in FIG. 4 in which the fabric pieces 28 and 29 are shown to be compressed by more than one-third and most preferably more than one-half their thickness dimension at positions immediately adjacent to edges 32 and 33.

It will be appreciated that in FIG. 4 bases 31 of the rollers compress the fabric pieces 28 and 29 to a maximum depth. By comparison with FIG. 5, however, it will be seen that the counter-rotating rollers 26 and 27 first engage fabric pieces 28 and 29 at about entry points 34. As the rollers counter-rotate in the direction of arrows 36 they progressively compress the fabric pieces in the thickness dimension until a maximum depth is reached, usually at about plane 37, which is the closest point between the rollers.

In the embodiment of the fabric manipulation apparatus of FIGS. 1–5, the sides 41 and 42 of rollers 26 and 27 are spaced apart. As bases 31 of the rollers compress pieces 28 and 29 in the thickness dimension, therefore, vertically extending shoulders or areas 43 and 44 facing in directions opposed to edges 32 and 33 are formed. During relative movement between the rollers and fabric pieces, peripheral roller surfaces 41 and 42 progressively apply lateral forces through areas 43 and 44 in the direction of edges 32 and 33. These opposed lateral forces also progressively increase during movement as the rollers approach plane 37 between the centers of rotation of the rollers. The lateral forces applied by peripheral surfaces 41 and 42 first move the fabric sheets or pieces together into abutting contact along seam 39, as aided by operator manipulation of the pieces, and thereafter, they firmly press edges 32 and 33 against each other to insure reliable adhesive bonding of the seam. As will be seen, the resiliently compressible fabric is compressed in two perpendicularly oriented directions by the rollers during motion of the fabric pieces past the rollers. The thickness compression creates a shoulder, thrust area or purchase on the fabric piece, which is then used to compress the fabric laterally and thereby press edges 32 and 33 together in a firm or positive fashion.

It should be noted that the rollers 26 and 27 also gradually exit or allow resilient expansion in both the thickness and lateral directions of the neoprene pieces downstream of centerline or plane 37, with the rollers leaving contact with the neoprene at about exit points 45. This gradual relaxation after maximum pressure at plane 37 insures that the resilient nature of the fabric pieces does not rapidly pull apart the bond achieved by pressing the edges together. Moreover, even on the downstream side of plane 37, the resilient compressibility of the fabric sheets tends to maintain a diminishing positive pressure between the edges as they decompress.

The fabric urging assembly of the present invention, therefore, takes advantage of the inherent resilient compressibility of neoprene foam to provide a mechanism for positive pressing of the opposed edges together over substantially their full height.

Using the rolling pressing action of seaming apparatus 21, seamed fabric members or sheets have been produced which are noticeably more uniform and free of residual stress in the bond produced along the seam. It is hypothesized that the progressive rolling contact and resilient compression of the fabric by rollers 26 and 27, and possibly the gradual decompression, produces a butt seam in which the opposed portions of edges 32 and 33 are joined together in a more continuous and stress-free relationship.

If a butt seam which is produced by a convention pneumatic clamping technique is stressed by pulling the fabric pieces away from the seam in opposite directions, the seam will be seen to pucker significantly along the seam. This puckering phenomenon suggests that the clamping process has resulted in non-uniform shifting or lateral discontinuities in bonding opposed edge portions during bonding. Thus, in conventional clamping processes two aligned edge portions seem to be very slightly shifted so as to result in bonding into the seam of a discontinuity or residual stress which apparently is the result of the clamping process.

In the process of the present invention the rolling contact of rollers 26 and 27 produces a seam 38 which when pulled apart does not pucker to the same degree as a conventional bonded seam. Under extreme loading there is some puckering, but under ordinary conditions very little variance in the uniformity of the bond along the length of the seam can be detected. As described below, the process of the present invention can be used to form curved seams in which one of the fabric sheets is stretched along the seam during bonding to the other fabric piece. Even when such stretching is employed, the seam rolling process of the present invention produces a relatively stress-free curved seam. There is a controlled, but relatively continuous, shifting and bonding together of edges to produce the curve, but the seam discontinuities resulting from conventional clamping processes are greatly reduced.

The importance of having a uniform stress-free or stress-reduced seam is that bonded seam failures appear to start from incipient cracking at residually stressed portions of the seam. A partially failed seam can be stressed by pulling the pieces apart and the seam failures will often be seen to occur at the stress induced puckers along the seam.

Thus, an important aspect of the present invention is the provision of an improved adhesively seamed resilient fabric sheet in which the seam is produced using a progressive rolling pressure to press opposed edges 32 and 33 of the fabric pieces together.

As may be seen in FIG. 4, it is preferable to form rollers 26 and 27 as solid, frusto-conical members having bases 31 which are relieved at 46 to provide a recess which receives the partially compressed material, for example at shoulder 47. As the rollers rotate past centerline 37, it is not desirable for the base surface 31 to pull the pieces apart. The relief or recess 46 minimizes the area of base 31 which might tend to pull the pieces away from seam line 39.

The roller means 26 and 27 also can take the form of a non-solid roller, for example, a pair of counter-rotating brush assemblies having near-vertical surfaces 41 and 42 and a lower or base set of brushes including recess or a low friction disk at base 31.

While rollers 26 and 27 are preferably idler rollers, as will be described in more detail hereinafter, an additional feature of fabric manipulating assembly 23 is that it can include transport means that will move pieces 28 and 29 relative to both the pressing rollers 26 and 27 and adhesive activating assembly 24.

In the form of FIGS. 1 through 5, however, mounted opposite rollers 26 and 27 is a transport roller 51 which is mounted for rotation about horizontal axis 52 and is spaced relative to rollers 26 and 27 so as to produce compression of the compressible fabric pieces. Thus, support table 22 can be formed with an opening 53 through which roller 51 projects. The surface of transport roller 51 can be roughened or provided with a high friction material, such as rubber, to insure frictional engagement and driving of the fabric pieces in the direction of arrows 54 in FIGS. 2 and 5. As best may be seen in FIGS. 2 and 5, it is preferable to include a pair of transport rollers 51 and 56, which transport rollers are driven at about the same speed by drive belts 57 and 58. In the most preferred form, upstream transport roller 56 operates at a slightly lower linear peripheral velocity so that downstream transport roller 51 pulls fabric pieces slightly between rollers 56 and 51. Drive belt 58 is connected to a drive motor (not shown).

In illustrated manipulating assembly 23, frusto-conical rollers 26 and 27 are not driven rollers. Thus, rollers 26 and 27 are mounted to shafts 59 and 61, which in turn are rotatably mounted in bearing assemblies 62 and 63. Frusto-conical rollers 26 and 27, however, do not drive the fabric pieces, but are merely idlers which roll with the fabric pieces and are driven by transport rollers 51 and 56.

In a modified form of the assembly shown in FIGS. 6, 6A, 7, 7A and 13, however, shafts 59a and 61a are driven through sheaves 64 (or sprockets 64a in FIG. 7), drive belts 66 (or roller chain 66a in FIG. 7) by means of drive motors 67. As will also be noted in FIG. 6, the transport roller 51 has been omitted and a low friction support surface, such as a TEFLON sheet 68, is used to support the fabric pieces 28a and 29a during compression by the fabric manipulating rollers.

In order to insure that fabric pieces 28 and 29 are resiliently compressed, even when they are of different thicknesses, it further is preferable that the roller assemblies be resiliently biased toward the fabric pieces. Thus, the roller element bearing assemblies 62 and 63 can be movably mounted to a slide block members 71 and 71a by mounting bolts 72. Extending outwardly from vertically reciprocal slide blocks 71 and 71a are spring flanges 131 and 131a, and the upper ends of the slide blocks are guided for vertical reciprocation by a guide rail 132 (FIG. 2), which projects from and is fixedly secured to stationary spring housings 133 and 133a. Mounted in housings 133 and 133a are a pair of compression springs 74 and 74a used to independently bias each of the bearing assemblies 61 and 63 and frusto-conical rollers 26 and 27 toward the fabric pieces by pushing against spring flanges 131 and 131a. Adjustment means 76 and 76a for changing the biasing force of springs 74 and 74a also can be provided. Slide blocks 71 and 71a are secured for guided reciprocation on spring housings 133 and 133a by fasteners 78 and 78a which slidably pass through elongated vertical slots 134 and 134a.

It is also possible to provide for lateral adjustment of bearing assemblies 62 and 63. As is apparent from FIG. 3, the fabric manipulating rollers are mounted for rotation about near vertical, but converging, axes 75 and 80. Means, such as threaded adjustment member 85, can be provided for adjusting the lateral spacing between spring housings 133 and 133a. A frame member 136, formed with vertically extending slot 137, has a member 138 secured thereto by fasteners 139. The fasteners 139 can, therefore, be used to set the vertical position of both housings 133 and 133a relative to frame member 136 and table 22.

Fixed with respect to member 138 is an outwardly protruding ear 141 which receives threaded member 85 therethrough. The threads on member 85 are left and right-handed threads on either side of ear 141. As best may be seen in FIG. 2, transversely extending guide rails 142 and 143 are mounted in notches in member 138 and housings 133 and 133a. Rails 142 and 143 are fixed to member 138 and slidably received in notches 146 and 147 in housings 133 and 133a.

When the knob on adjusting screw 85 is turned, therefore, housing 133 and 133a, which have threads mating with the threads of opposite hand on member 85, are displaced toward or away from each other. This allows the spacing between side surfaces 41 and 42 of the rollers to be laterally adjusted.

It is believed that a vertical orientation of surfaces 41 and 42 at plane 37 is the most preferable. Obviously, frusto-conical surfaces 41 and 42 will be vertical at plane 37 only if the apexes of the conical surfaces and axes 75 and 80 intersect at a vertical plane between the rollers. Thus, in the preferred form, the angle of skew of axes 75 and 80 is matched to the angle of convergence of surfaces 41 and 42.

It is preferable, however, that rollers 26 and 27 be removably mounted in bearing assemblies 62 and 63. This permits, for example, the substitution of rollers with different conical angles of surfaces 41 and 42 as compared to the angles of convergence of axes 75 and 80. The result will be surfaces 41 and 42 which either converge toward the vertical or diverge away from the vertical. Similarly, adjustment means (not shown) can be provided to enable adjustment of the angles of surfaces 41 and 42.

Typically, surfaces 41 and 42 are positioned so that they barely contact each other. Engagement of the rollers with resiliently compressible foam pieces causes roller side surfaces 41 and 42 to separate by a small distance, for example, about one-half the thickness of the fabric being seamed, or less. As will be seen and described in connection with FIG. 7A, however, the spacing between opposed roller sides also can be completely eliminated. When there is some space between roller sides 41 and 42 it is further preferable that the apparatus of the present invention include a hold-down device, such as spring blade member 90 (FIG. 2), which wipes against or presses down fabric pieces 28 and 29 immediately in advance of rollers 26 and 27. Hold-down blade resists any tendency of the fabric to climb the side walls 41 and 42 between the rollers when the rollers are spaced apart.

A further alternative embodiment of the present invention is shown in FIG. 6A in which a first pair of fabric compressing rollers 26b and 27b are driven through drive belts 66b, while a second set of similarly formed idler frusto-conical rollers 81 and 82 engage a bottom side of the fabric pieces 28b and 29b. Obviously, it would also be possible to power bottom rollers 81 and 82 in addition to, or as an alternative to, powering the top rollers 26b and 27b. Similarly, the top rollers 26b and 27b can be powered, as shown, and an idler support roller similar to roller 51 provided in lieu of the rollers 81 and 82.

In the forms of the invention described, the transport means or assembly is effective to frictionally engage and move the pieces passed the rollers and adhesive activation assembly. This enables the seam forming apparatus of the present invention to operate in a manner very similar to a sewing machine and permits the continuous seaming together of relatively long seams, as for example, may be found on arms and legs of garments. It would be possible, however, to have the pieces supported in a relatively stationary fashion and move the roller and adhesive activation assemblies while still employing many of the features as above described. Thus, transport rollers 51 and 56 could be eliminated and assemblies 23 and 24 mounted to a movable carriage.

It is important to note that butt seaming apparatus 21 can be used to form butt seams which are curved or arcuate. It is possible, for example, to use compression roller assembly 23 to join two fabric pieces together along a curved seam 39 by stretching or pulling on one of the pieces in a direction along the seam during the joining and bonding process. This will cause the inherent resiliency in the neoprene fabric to produce a uniform but arcuate or curved seam 39. If the amount of curvature is to be accurately controlled, the upper surfaces of the fabric materials can be marked with indicia permitting the amount of elongation to be gauged by the operator by lining up the indicia. For pieces which are relatively short and uniformly curved over their lengths, one piece can simply be elongated until it matches the other.

Since neoprene fabric is not inherently capable of being bonded together in a butt seam merely by the pressing together of edges of the fabric, seam forming apparatus 21 further includes an assembly 24 for activating and/or applying an adhesive material on at least one, and preferably both, of edges 32 and 33. Assembly 24, therefore, can be an assembly for applying adhesive to edges 32 and 33, or it can be an assembly for activating an adhesive placed on the edges in a separate operation. Assembly 24 also can be a neoprene solvent application means that will cause edges 32 and 33 to be bonded together by a solvent bonding process. Solvent bonding of neoprene foam, however, is more difficult to reliably achieve, and in the preferred form, edges 32 and 33 are coated with an adhesive by a separate process with the adhesive coating being activated by assembly 24.

During the fabrication of wet suits, as is common in the clothing industry, a plurality of sheets of neoprene are all stacked together and cut around the same template at the same time. This produces a stack of similar pieces which have their edges falling on a common, usually curvilinear, surface. While the pieces are still clamped together after cutting, it is relatively easy to apply an adhesive material to all of the edges simultaneously by painting the same on the edges. The adhesive can then be allowed to dry and the various pieces separated from each other for joining to other complementary pieces along butt seams used to produce the aquatic garment.

Accordingly, while assembly 24 can be either adhesive activation means and adhesive application means, it is preferred in most embodiments that assembly 24 be provided as adhesive activation means mounted proximate the fabric manipulating assembly so as to activate adhesive material carried by one of edges 32 and 33 at a location producing bonding of the edges when pressed together by the compression rollers 26 and 27.

Heat has generally been regarded as detrimental to adhesively bonded neoprene seams. An important feature of the present invention, however, employs ensonification means as an energy source for thermally activating a dry adhesive previously placed on edges 32 and 33. Thus, sonic energy, preferably in the ultrasonic frequency range, or at least over 10 kilohertz, can be transmitted to pieces 28 and 29 via ultrasonic horn 91 having a lower end or surface 92 which contacts the fabric pieces at a position superimposed over edges 32 and 33. It has been found that by transmitting sonic energy via a transducer 91, in the frequency range above about 10 kilohertz, even dried neoprene contact cement can be virtually instantaneously activated and then bonded by compression rollers 26 and 27 in a continuous process. A frequency of 20 kilohertz provides satisfactory results and is a standard frequency in commonly available commercial ultrasonic equipment.

A neoprene adhesive which is capable of activation after it has dried by sonic energy is a neoprene contact cement manufactured by Stabond Corporation and sold under the trade name STABOND 0836 neoprene contact cement. Similar neoprene bonding cements are manufactured by Bostick and other major adhesive manufacturers. It should be noted that for best results the contact cement should be ensonified within about 48 hours after application to the edges of the neoprene sheets. With sufficient sonic energy, activation can be accomplished while advancing pieces of neoprene under horn 91 at a rate at least as high as six (6) inches per second.

As will be apparent, for best results the activation of adhesive on edges 31 and 32 should be in advance but sufficiently close to compression rollers 26 and 27 so that the adhesive is still activated when it reaches the rollers. However, there is considerable flexibility in the location of the ensonification means, and FIG. 6 illustrates an ultrasonic transducer horn 91a mounted beneath compression rollers 26a and 27a. The end 92a of horn 91a can either extend through an opening in low friction support surface 68 or be coupled through a thin low friction support surface to transmit sonic energy to the edges of the fabric pieces and the adhesive thereon. The thickness and type of material of sheet 68 will determine whether or not the sonic energy is directly applied to the fabric pieces or coupled through surface 68.

It would also be possible to transmit sonic energy to edges 32 and 33 through a ultrasonic transducer formed as a roller, for example, transport roller 51 or transport roller 56. There are currently on the market transducers in the shape of roller elements that it is believed could be combined to both transport material and transmit sonic energy.

Other forms of adhesive activation are suitable for use with the seam forming apparatus of the present invention. FIGS. 8 through 12 and 7A illustrate adhesive activating means 24a–24f which are in each case located immediately in advance of a fabric manipulating or counter-rotating compression roller assembly 23a–23f.

In FIG. 8, the adhesive activation means is a heated element, such as a hot knife 101, which extends down between edges 32 and 33 and contacts the edges as they are brought together by the compression rollers.

In FIG. 9, the adhesive activation means 24b is provided as a conduit 102 with a nozzle end 103 which directs a stream of hot gases down across edges 31 and 32. In FIG. 10, assembly 24c can either be a solvent applying activating assembly or an adhesive applying assembly. Thus, a reservoir 104 may contain either solvent 106 for activating an adhesive carried on edges 32 and 33, or it may contain a liquid adhesive itself. A perforated dispenser end 109 extends down between the opposed edges to be joined and wipes a solvent onto adhesive on the edges, or applies an adhesive to the edges.

In FIGS. 11 and 11A, adhesive activating means 24d is provided by a laser 111 with fiber optic conduits 112 and 113 that direct laser energy toward edges 32d and 33d of pieces 28d and 29d. A $CO_2$ laser with appropriate infrared energy output would be suitable for use in this invention.

In FIG. 12, adhesive activating means 24e can take the form of an inductive transmission assembly 114 which inductively couples to adhesive on the edges of the fabric pieces by providing iron particles or other inductively heatable material in the adhesive and/or edges.

Finally, in FIG. 7A a radio frequency heating means 24f is shown in which an RF emitter source can be used to activate an adhesive using frequencies from short-wave communication frequencies up through and including microwave frequencies, e.g., 1.5 Mhz to 2 Ghz.

Referring again to FIG. 7A, a form of roller-based fabric manipulating assembly 23e is shown in which counter-rotating rollers 151 and 152 have a frusto-conical shape with side walls 153 and 154 mounted in abutting rolling contact with each other at a position substantially aligned with or superimposed over abutting edge 156 and 157 of neoprene fabric pieces 158 and 159.

In the form of the invention shown in FIG. 7A rollers 151 and 152 are driven by shafts 161 and 162 which are coupled to drive means, not shown, and the fabric pieces being seamed are supported on a low friction support surface 163.

In FIG. 7A, however, the sides 153 and 154 of rollers do not effect pressing of edges 156 and 157 together. Instead, annular base surface portions 166 and 167 proximate and perpendicular to sides 153 and 154, compress neoprene foam pieces 158 and 159 by an amount which is sufficient to stabilize the resiliently compressible fabric and to enable lateral forces to be applied to top surfaces 168 and 169 of the compressed portions of the pieces to firmly press edge 156 and 157 together. This lateral thrusting process is preferably aided by central base portions which are provided as high friction (for example, rubber) surfaces 171 and 172. Note that the high friction surface need not extend to annular base portions 166 and 167.

As will be seen in FIG. 7A, the pieces of fabric being joined are neoprene having nylon cloth layers 173 and 174 on both the top and bottom surfaces. Thus, rollers 151 and 152 must compress the fabric pieces sufficiently to cause the resiliently compressible pieces to act as a solid substantially non-compressible member in the area proximate the edges. The radial component of movement of the rollers, while parallel to the pieces, will provide sufficient lateral thrust to bond the edges together.

The amount of compression required to stabilize a portion of the fabric pieces sufficiently to cause it to act in a manner similar to a substantially non-compressible member varies with the foamed neoprene being seamed. For most neoprenes compression by at least one-third of the fabric thickness will be required and by at least one-half of the thickness is preferred.

In FIG. 7A the tendency of the pieces climbing up between the rollers is also eliminated by contact between sides 153 and 154. Again, the use of rollers counter-rotating on inclined axes results in a gradual increase of both the compression of the pieces and the lateral forces applied to the pieces, which is believed to aid in the uniformity and substantially stress-free bond which is produced.

Another form of seam forming apparatus of the present invention is shown in FIGS. 13 and 14. Powered rollers 181 and 182 are counter-rotated and slightly spaced apart so as to permit side walls 183 and 184 to apply the primary lateral force pressing edges 186 and 187 of fabric pieces 188 and 189 together.

In order to prevent climbing of fabric pieces up between the rollers, and equally importantly, in order to effect better coupling of sonic energy from transducer 191 to the adhesive on edge 186 and 187, pressure foot means 192 is mounted in opposed relation to and biased toward ensonification means 191.

Thus, in FIGS. 13 and 14 it will be seen that support table 193 is formed with an opening 194 and the upper surface 196 of ensonification transducer 191 extends through opening 194 and is flush with the table. Pressure foot 192 may be pneumatically, hydraulically or spring biased by spring 197, which may be mounted to provide an adjustable spring force, to press the adhesive carrying edges against transducer surface 196. The downstream end 198 of pressure foot 192 preferably is shaped to mate with but be slightly spaced from seaming rollers 181 and 182 so as to maximize the length of pressurized coupling to the transducer along the seam, to resist any climbing tendency of the pieces and to help transport the fabric to the seaming rollers.

Finally, FIGS. 15 and 16 illustrate a clamping apparatus that could be used with the ensonification or other adhesive activation techniques of the present invention in a continuous seam forming process.

As shown, a pair of clamping jaws 201 and 202 shown in solid lines in FIG. 15 in a staring position out of engagement with fabric pieces 203 and 204. Transport means, in the form of pinch rollers 206 and 207, pull the neoprene pieces in the direction of arrow 208.

Drive means, for example a cam and follower (not shown) rotates the jaw assembly about axle 211 from the solid line position of FIG. 15 to the dotted line position, as shown by arrow 209. The ends 212 and 213 of the jaws compress pieces 203 and 204 proximate and inwardly of edges 214 and 216.

As ends 212 and 213 engage moving fabric pieces 203 and 204, the carriage 217 and 218 is driven forward on guide rails 221 and 222 in the direction of arrow 219 to the phantom line position in FIG. 15. Obviously, the carriage and clamping assembly are driven forward at the same rate as the fabric pieces are advanced.

As the jaws are advanced forward, drive means such as a cam (not shown), applies a clamping force to jaws 201 and 202, as shown by arrows 223 in FIG. 16. The jaws then press edges 214 and 216 together on the fly. At the end of the forward stroke of carriage 217 and 218, the jaws are opened, raised and returned to the solid line position of FIG. 15. The cycle is then repeated. Jaws 201 and 202 can be biased by spring 226 and 227 for pivoting about member 228 to the open position, and appropriate counter weighing or upward biasing of the jaw assembly weight can also be provided.

While broadly effective in continuously forming a seam, the clamping assembly of FIGS. 15 and 16 is less desirable than the roller assemblies of the other figures since the resulting seam will tend to have residual stress in the bonded edges.

Using the butt seam forming apparatus of the present invention in which the adhesive activation means is provided by an ultrasonic transducer and seam bonding effected by seaming rollers, fabrication of wet suits and dry suits at a rate and cost which is comparable to suits having sewn seams can be achieved. Seaming apparatus 21 of FIG. 1 can be operated, for example, by foot pedals 25, so as to control the rate of advancement of the fabric pieces and by foot pedal 30, so as to control the operation of ensonifier 91, in a manner which is quite similar to a conventional sewing machine.

What is claimed is:

1. A method of continuously forming an adhesively bonded seam between opposed edges of two pieces of resiliently-compressible, foamed elastomeric fabric, said method comprising the steps of:

providing adhesive on the edge of at least one of said pieces;

moving said pieces continuously past a sonic energy generating adhesive activation device and continuously thereafter directly through a fabric manipulation assembly positioned proximate said adhesive activation device; and during said step of moving said pieces continuously, (i) activating said adhesive on said edge of said at least one of said pieces by applying sonic energy to said adhesive with said adhesive activation device; and (ii) firmly urging said edges laterally against each other to form said bonded seam by progressively compressing each of said pieces in a thickness dimension of said pieces and immediately proximate and inward of each of said edges with said fabric manipulating assembly and, as each of said pieces is progressively compressed, simultaneously applying a lateral force progressively along and inward of said opposed edges to each of said pieces in a direction toward said opposed edges with said fabric manipulating assembly.

2. The method as defined in claim 1 wherein,
said step of applying sonic energy is accomplished by transmitting sonic energy to said adhesive in a frequency above 10 kilohertz.

3. A method as defined in claim 1 wherein,
said fabric manipulating assembly includes roller elements, said roller elements compress said pieces and apply said lateral force, and said roller elements rollingly engage each of said pieces progressively along said opposed edges.

4. A method as defined in claim 3 wherein,
said roller elements are frusto-conical roller elements having sides thereof spaced apart from each other, said pieces are compressed in said thickness dimension inwardly of said edges by said roller elements to define shoulders and said roller elements apply said lateral force to each of said pieces through said shoulders.

* * * * *